A. G. BINNS.
LOCK NUT.
No. 101,421. Patented Apr. 5, 1870.
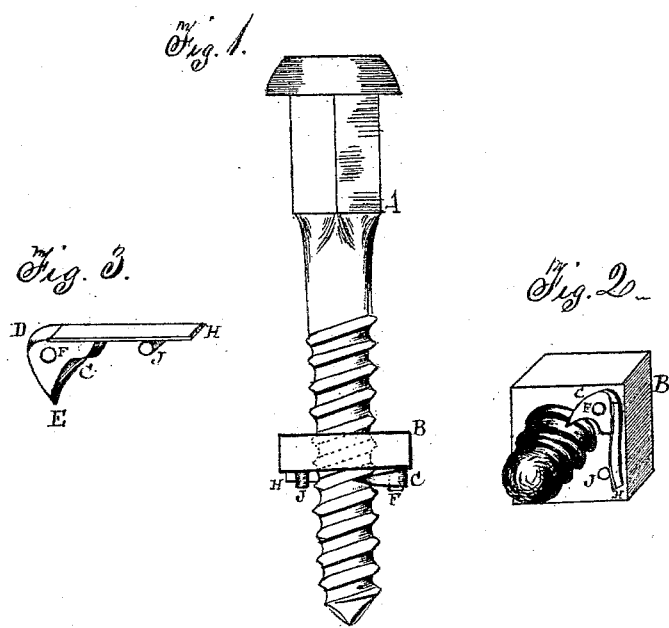

United States Patent Office.

AMOS G. BINNS, OF PITTSBURG, PENNSYLVANIA.

Letters Patent No. 101,421, dated April 5, 1870.

IMPROVEMENT IN LOCK-NUT.

The Schedule referred to in these Letters Patent and making part of the same.

To all whom it may concern:

Be it known that I, AMOS G. BINNS, of the city of Pittsburg, county of Allegheny and State of Pennsylvania, have invented an Improved Nut-Fastener; and I do hereby declare the following to be an exact description thereof, reference being had to the accompanying drawings, and to the letters of reference marked thereon, making a part of this specification, in which—

Figure 1 represents a screw-bolt and nut, with the fastener attached by a pivot and spring to the lower side of the nut.

Figure 2 shows the lower side of the nut, with the fastener attached, and the point of the fastener pressing into the groove between the flanges of the screw.

Figure 3 shows the shape of the spring fastener.

The nature of my invention consists in the shape of the fastener, and its construction and combination with the nut and its screw, for the purpose of holding and permanently fastening the nut on any point of the screw.

A represents a screw-bolt, and
B, the nut.

C is the metallic fastener, that has a rounding head, D, tapering to a point, E, below.

The head or center of the fastener is attached to the nut B by a pivot, F, upon which the fastener acts.

On the top or outer side of the fastener C is a flat spring, H, that is permanently attached to the fastener, while its opposite end rests upon or against a projecting pin, J, extending from the nut.

The point E of the fastener rests in the thread or groove between the flanges of the screw, horizontally, on a line with the nut, while the flanges move obliquely, and when the nut is disposed to work loose, the point E presses against the flange of the screw, and locks the screw firmly and securely, the point E being made of steel or other hard metal.

What I claim as my invention, and desire to secure by Letters Patent, is—

The nut B, provided with the dog F, spring H, and with or without pin J, in combination with the screw A, substantially as described.

Witnesses:  A. G. BINNS.
J. FRANKLIN REIGART,
EDM. F. BROWN.